Patented Aug. 30, 1932

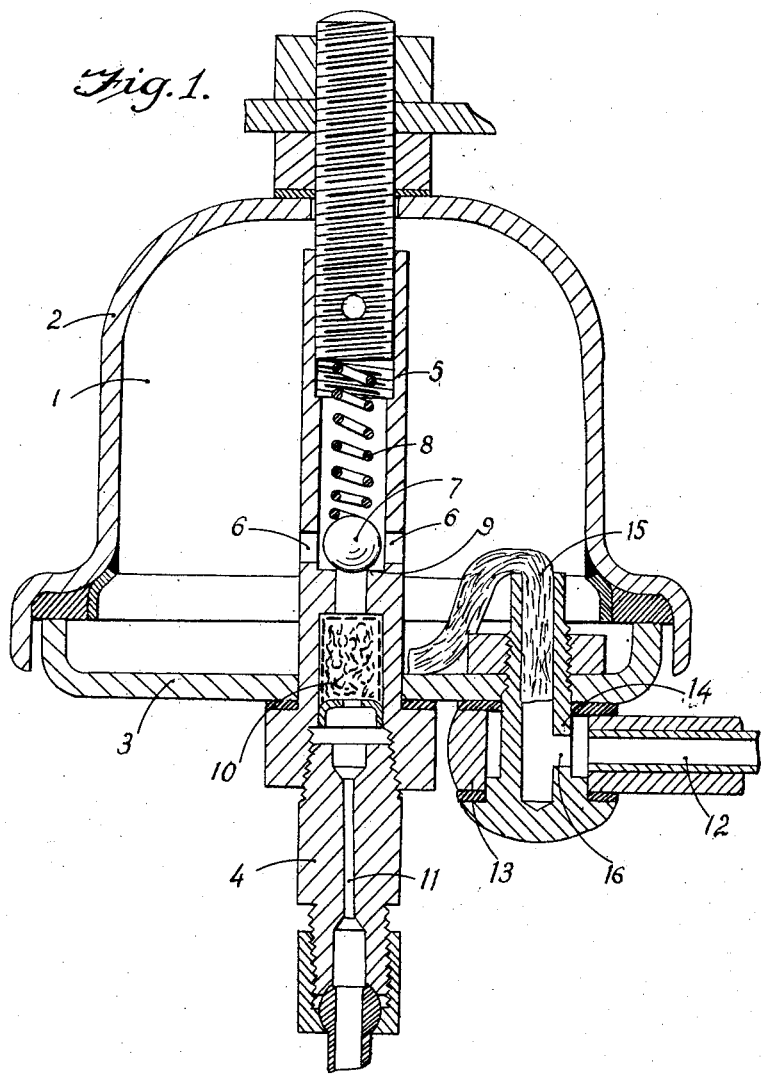

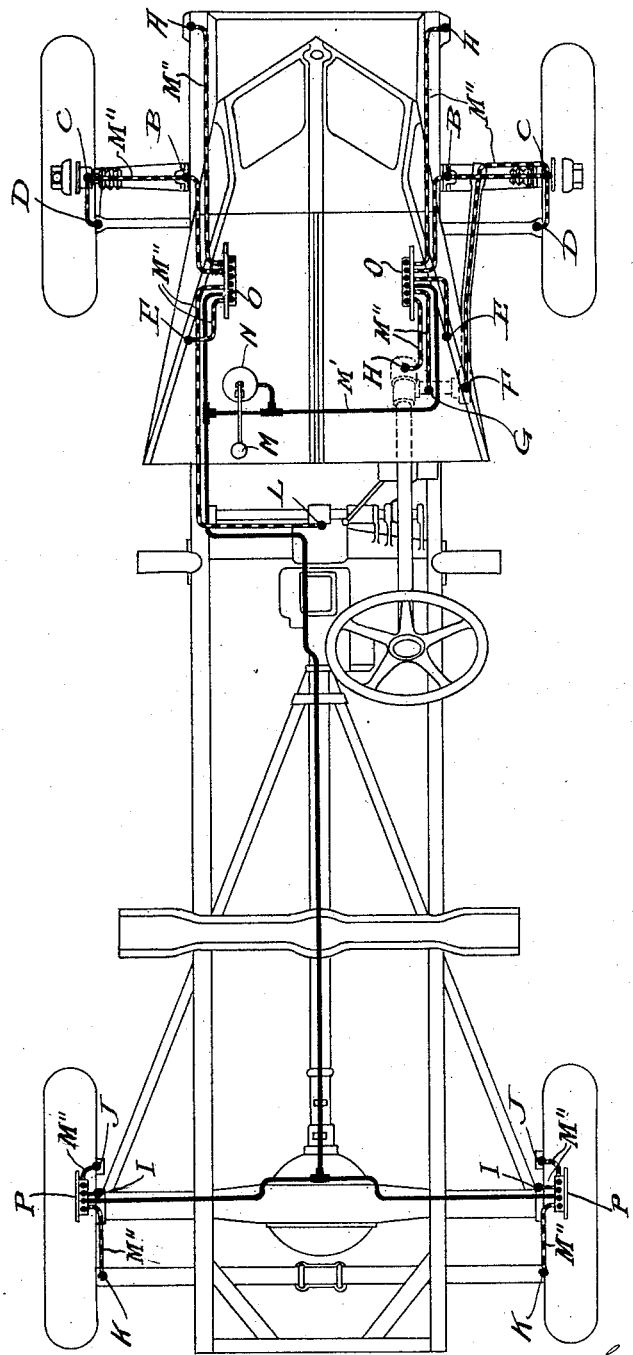

1,874,809

UNITED STATES PATENT OFFICE

LEON SAIVES, OF BILLANCOURT, FRANCE, ASSIGNOR TO LOUIS RENAULT, OF BILLANCOURT, FRANCE

SYSTEM OF LUBRICATION FOR VEHICLES

Application filed September 18, 1930, Serial No. 482,893, and in France October 2, 1929.

The invention relates to the lubrication of vehicles and more particularly of self-propelled vehicles. It relates to a general system of lubrication of all the members of the underframe, known by the term "central lubrication". The system which is the subject of the invention is characterized essentially by the distribution of the lubricating liquid; which may be oil subjected to pressure by any suitable means at a main supply; to distributors or intermediate reservoirs arranged in suitable number and at suitable localities on the under frame, and from which distributors branch pipes extend to the members to be lubricated. These distributors are preferably located at such positions that the pipes supplying them have substantially the same length, so that the losses of pressure may be the same in said pipes, and that the output of oil at the different places to be lubricated by a distributor may be substantially the same.

The invention also relates to certain arrangements of details which will be hereinafter described.

In the accompanying drawings, Figure 1 shows in section through its axis, one construction given by way of example of a distributor for the lubricant in accordance with the invention. Figure 2 is a diagrammatic showing of the system of lubrication.

On reference to Figure 1 of the drawings it is seen that the distributor or intermediate reservoir is shown at 1. This distributor is preferably composed of an easily removable bell 2 attached upon a dished plate 3. A nozzle 4, communicating with this distributor through said plate 3 is connected with the main oil supply, which supplies the different distributors with forced lubrication. For this purpose there may be employed a pump driven by hand or electrically, by partial vacuum or in any other way. The lubricant may also be sent directly to the distributors by the oil-circulating pump of the engine. In this case a filter is interposed between the pump and the distributors. Upon the nozzle 4 is fixed a tube 5 perforated with a certain number of holes 6. A valve, for example a ballvalve 7, subjected to the action of an opposing spring 8, which forces it on to its seat 9 provided inside the tube 5, in certain conditions allows the oil under pressure coming from the nozzle 4 to pass through the holes 6 to the interior of the bell 2. An auxiliary filter 10 is located in the tube 5 in front of the valve 7. The nozzle 4 is provided with a passage 11 of section suitably dimensioned for the supply to the distributor and determined by the locality of this distributor and the pipes which it has to supply. Pipes 12 leading to the places to be lubricated are branched off from the distributor 1. These pipes, in the example shown, are connected by means of adjustable joints 13 to hollow pins 14 fixed in the dished plate 3 and projecting by a certain amount into the interior of the distributor. Wicks 15 placed in the bottom of the dished plate 3 are placed inside the hollow pins 14, which communicate through the hole 16 with the joint attached to the pipes 12. There are provided upon each distributor 1 a number of joints and pipes 12, corresponding to the number of points to be lubricated.

The operation of the apparatus can be readily understood. The oil under pressure coming from the main supply passes through the nozzle 4, the pipe 5 and the holes 6, lifting the valve 7 in the distributor 1. The oil will rise in the distributor to a fixed height and will compress the air which is above it in the bell 2. The oil in the distributor will thus be subjected to a certain compression and will be carried over by the wicks 15 to the holes 16 in the pins 14 and to the pipes 12 leading to the members to be lubricated.

The main supply comprising the pump intended to send the lubricant under pressure, or to control the flow of oil from the engine to the distributors, is attached to the vehicle within reach of the driver. The distributors are disposed on the underframe at places suitably selected so that each of them lubricates a group of members adjacent to each other as diagrammatically indicated in Figure 2; the pipes connecting the distributor with the different members which it supplies have preferably approximately the same length and are arranged as far as possible at the same height. Care should be taken that the loss of pressure may be the same for the different pipes. The regulation of the supply might evidently be effected in the several pipes by determining in a suitable way the section of the oil-passage in each of them.

Figure 2 shows an application of the lubricating system applied to a motor vehicle. As shown a main oil reservoir is operatively connected with a pump actuated by a pedal M, near the foot of the operator of the automobile. Pressure upon this pedal forces oil through the pipes M', to the distributors O and P from which oil is driven through the pipes M", to the points A, B, C, D, E, F, G, H, from the distributors O, and to the points I, J, K, from the distributors P.

It is to be clearly understood that this system of lubrication may be employed for the lubrication of any plant including a plurality of mechanical members to be lubricated.

I claim:

1. A lubricating system including an airtight reservoir, a valve-controlled oil intake leading into said reservoir, an off-take pipe leading from said reservoir to points to be lubricated, and a wick having one end located adjacent the end of said off-take pipe, the other end of said wick being extended into said reservoir.

2. A lubricating system comprising a bell, valve-controlled means for feeding oil into the lower portion of said bell whereby to create a pressure above the oil, an off-take pipe terminating below said bell and extending to points requiring lubrication, a tube projecting into the lower portion of said bell at a point adjacent the end of said off-take pipe, and a wick having one end in said bell and the other end located adjacent the mouth of said off-take pipe.

3. A lubricating system comprising an airtight oil reservoir, means for feeding oil into said reservoir from below, whereby to create air pressure at the top of the bell, an off-take pipe leading into said bell at a point near the bottom thereof, and a wick having one end extending into said bell, the other end of the wick terminating adjacent the end of said off-take pipe.

4. A lubricating system comprising an airtight oil reservoir, means for feeding oil into said reservoir from below, whereby to create air pressure above the oil, a housing below the bell, an off-take pipe leading into said housing, a tubular pin carried by said housing and having its top end opening in said bell, and a wick extending through said pin, one end of said wick extending inside of said reservoir and the other end being located in said housing adjacent the end of said off-take pipe.

5. A lubricating system comprising an airtight oil reservoir, an intake pipe adapted to deliver oil into the lower portion of said reservoir whereby to create a pressure on the top of the oil, a plurality of distributor pipes, of substantially equal lengths, extending to points to be lubricated, a housing at the lower portion of said reservoir, including a tubular pin, a wick extending through said pin and into said housing, and a take-off pipe having one end extending into said housing and adapted to lead oil from said reservoir to said distributor pipes.

In testimony whereof he has signed this specification.

LEON SAIVES.